(12) United States Patent
Mølgaard et al.

(10) Patent No.: US 7,656,561 B2
(45) Date of Patent: Feb. 2, 2010

(54) IMAGE COMPRESSION FOR RAPID HIGH-QUALITY IMAGING

(75) Inventors: Claus Mølgaard, Nærum (DK); Thomas Alexander Rogon, Virum (DK); Thomas Andersen, Glumso (DK)

(73) Assignee: Phase One A/S, Frederiksberg (DK)

( * ) Notice: Subject to any disclaimer, the term of this patent is extended or adjusted under 35 U.S.C. 154(b) by 685 days.

(21) Appl. No.: 10/865,748

(22) Filed: Jun. 14, 2004

(65) Prior Publication Data

US 2005/0276496 A1    Dec. 15, 2005

(30) Foreign Application Priority Data

May 31, 2004    (DK) .............................. 2004 00846

(51) Int. Cl.
*H04N 1/41* (2006.01)
(52) U.S. Cl. .................... 358/426.01; 358/426.13; 382/232; 382/244
(58) Field of Classification Search ........... 382/162, 382/166, 232, 233, 238, 239, 244, 245, 246, 382/248, 250; 358/426.01, 426.13, 426.14, 358/539
See application file for complete search history.

(56) References Cited

U.S. PATENT DOCUMENTS

| | | | | |
|---|---|---|---|---|
| 4,958,235 | A * | 9/1990 | Sims et al. ................. | 358/402 |
| 5,553,200 | A * | 9/1996 | Accad ........................ | 358/1.9 |
| 6,097,838 | A | 8/2000 | Klassen et al. | |
| 6,614,483 | B1 | 9/2003 | Lee et al. | |
| 6,694,061 | B1 * | 2/2004 | Acharya ..................... | 382/251 |
| 6,744,929 | B1 | 6/2004 | Okada | |
| 2002/0041761 | A1 | 4/2002 | Glotzbach et al. | |
| 2002/0044778 | A1 | 4/2002 | Suzuki | |
| 2003/0222996 | A1 | 12/2003 | Patej | |
| 2004/0008896 | A1 | 1/2004 | Suzuki | |

FOREIGN PATENT DOCUMENTS

DE    102 54 192 A1    9/2003

(Continued)

OTHER PUBLICATIONS

S. Battiato et al.; Coding Techniques for CFA Data Images; Proceedings of the 12th International Conf. on Image Analysis and Processing; 2003; IEEE.
Toi et al.; A Subband Coding Techniqui for Image Compression in Single CCDE Cameras With Bayer Color Filter Arrays; IEEE Transactions on Consumer Electr; vol. 45, Feb. 1999.

(Continued)

*Primary Examiner*—Thomas D Lee
(74) *Attorney, Agent, or Firm*—Volentine & Whitt, P.L.L.C.

(57) ABSTRACT

Lossless, near-lossless, and lossy compression and decompression of digital image data, whereby the image data can be compressed and decompressed on-the-fly with no need for external RAM resources for temporary data storage while compressing/decompressing image data. Implementing the algorithm only requires a very limited amount of silicon and yields very high performance in relation to very low power consumption. The described implementation is optimized for raw image data from a sensor with a Bayer filter pattern but can be used on data from image sensors with ay color filter. The compression algorithm contains a line indexing formation which enables very fast subsampling of an already compressed image and the possibility to decompress only parts of an image—this improves performance and reduces the need for temporary RAM storage greatly when zooming and in postprocessing.

10 Claims, 7 Drawing Sheets

FOREIGN PATENT DOCUMENTS

| | | |
|---|---|---|
| EP | 0 469836 A2 | 7/1991 |
| EP | 1 173 005 A2 | 12/2000 |
| JP | 2000244935 | 11/1999 |
| WO | WO 00/75859 A1 | 12/2000 |

OTHER PUBLICATIONS

Koh et al.; New Efficient Methods of Image Compression in Digital Cameras With Color Filter Array; IEEE Transactions on Consumer Electronics, vol. 49, No. 4, Nov. 2003.

* cited by examiner

IMAGE COMPRESSION FOR RAPID HIGH-QUALITY IMAGING

FIELD OF INVENTION

The present invention relates to lossless or reversible, near-lossless, and lossy compression and decompression of digital image data. In particular, the invention relates to (de)compressing image data on-the-fly with no need for external RAM (Random Access Memory) resources for temporary data storage.

BACKGROUND OF THE INVENTION

Image resolution is ever increasing and so are the accompanying frame rates. All in all this results in increasing demands to system bandwidths, transporting media bandwidth as well as storage capacity of both temporary storage (e.g. RAM) and permanent storage (e.g. HDD (Hard Disc Drive)). The strains on all these function blocks will be reduced if image data is compressed. Historically memory and permanent storage media bandwidths have not been increasing as rapidly as data processing means, which indicates that using on-the-fly image compression will yield much higher system performance than just adopting technological improvements in memory and permanent storage bandwidths. The higher performance can also be traded in for lower system costs, as less memory and permanent storage is required. Along with this, lower performance memory and storage means can be used. Another benefit, particular in portable products, is the ability to reduce power consumption as the power needed for the image compression can be much less than that required by additional memory and additional permanent storage.

Prior solutions based on industry standards like JPEG (Joint Photographic Experts Group), require a lot of silicon to be implemented in hardware and are often too slow when implemented in software—this is particular the case if the bit-depth of pixels increase from the traditional 8 bits per color to e.g. 16 bits per color. Today the higher bit-depths are a natural thing in high-end digital imaging. This improves the color fidelity and enables more advanced image processing to be applied in order to obtain more satisfactory results than previously accepted. If JPEG or similar compression algorithms are used, the RAW image data must be fully calibrated, interpolated, and enhanced prior to the compression itself, this is outlined in the block diagram of FIG. 1. This increases the complexity and cost of the system and reduces the ability to generate high-quality images, as a lot of image enhancement is required for optimum results, sometimes in combination with user interaction. Vast amounts of processing resources are normally not present in portable devices like digital cameras. Accordingly, improvements are needed in the processing of image data.

EP 1 173 005 describes a method for compressing raw color image data by mapping different color planes into square sections and compressing these independently. The decompressed file must then be re-mapped to restore the original pattern of the color image data.

U.S. Pat. No. 6,614,483 describes a method for providing a simple lossy image compression. The method compresses image data in a lossy manner by dividing down pixel values by a loss factor and thereby creating an evenly distributed linear loss in the pool of image data. From an image-quality point of view, it is a disadvantage that this approach will increase the amount of digital noise in the darker areas of the resulting decompressed image as presented on either paper or a computer monitor. The reason being that image processing for preparing data for a more appropriate appearance requires multiplying image data with a gamma function.

In U.S. Pat. No. 6,614,483, the described algorithm also needs data to be handled by a color extraction unit prior to the actual compression. This color extraction unit performs a very simple pixel interpolation to generate red, green, and blue values for each pixel. This instantly reduces the possibility of generating a high quality image at a later stage.

The variable length (VL) encoding described in U.S. Pat. No. 6,614,483 is based on a combination of 1's complement VL encoding with leading "zero" and "one" detection. This form of encoding works well with image data with low color bit-depth (e.g. 8 bits), but often yields poor results when used with image data with high color bit-depth (e.g. 16 bits) and a relatively high amount of entropy, which are all characteristics for high-quality imaging.

Another limitation of the implementation described in U.S. Pat. No. 6,614,483 is that it requires an external or internal buffer to hold at least two adjacent lines of image data to be able to do simple color interpolation. With high resolution image sensors, the required amount of temporary storage can be quite high and thereby increase system cost if the buffer is implemented together with the block that carries out the compression itself. Using cheaper external storage (e.g. Dynamic RAM, DRAM) will often be unacceptable from a performance point of view.

SUMMARY OF THE INVENTION

The invention provides on-the-fly compression and decompression of digital image data. The invention requires no external RAM resources for temporary data storage while compressing or decompressing image data. In the present context, on-the-fly means that data is processed, here compressed or decompressed, at the same rate as it is input to the relevant section.

In high quality digital imaging, an important feature is to get the recorded data stored or transmitted as fast as possible to make the camera ready for the next exposure as fast as possible.

It is an object of the present invention to provide a method and an apparatus for performing fast on-the-fly compression of image data to generate small compressed image data files which can be stored and/or transmitted cheaply and efficiently.

The professional photographer requires total control of the processing of image data, since different processing tools are preferred for different jobs. Image data which have not been processed prior to compression, e.g. by color interpolation, give smaller image data files which can be compressed and stored or transmitted faster.

It is another object of the present invention to provide a method and an apparatus for compressing raw image data in order to reduce the size of the compressed image data files. The method and apparatus may include the feature of calibrating the raw data for inherent noise and artifacts of the camera.

Lossy compression gives even smaller compressed image data files, and allows for even faster and cheaper handling of files. but also deteriorates the quality of the decompressed image. In the present invention, near-lossless compression is implemented using a gamma function to provide a compression that is visually lossless as it only affects image data in the same manner as the later image postprocessing, e.g. in relation to presenting recorded images on a monitor or a printout. Such postprocessing always applies a gamma curve to convert the linear response of the image sensor to a more logarithmic response which is used to ensure that the final result looks correct when displayed on a monitor or another output device such as a printer. By deliberately reducing bits whose significance will later be suppressed in presenting the image, no noticeable loss is introduced, such reduction is called near-lossless. The process simply removes data which would anyway later be removed by the final image enhancement processing prior to presentation. In the present invention, the gamma curve has a built in bit reduction function which preserves maximum amount of information for the lower values whereas higher values will contain larger errors. This is not visible in the final image as the same kind of bit reduction is always applied to the final processed image.

It is still another object of the present invention to provide a method and an apparatus for performing a near-lossless compression of image data by performing a gamma correction and a bit reduction prior to compression. A corresponding inverse gamma correction is to be performed when decompressing the data.

In predicting pixel values, one is often left with the choice between prediction accuracy and speed. Advanced prediction algorithms can give less prediction errors and thereby increase the compression rate, as fewer errors need to be encoded and stored. Simpler prediction routines are faster with poorer predictions, especially for image data with much variation, resulting in smaller compression rates. According to the invention, speed has a high priority since image data is compressed on-the-fly. The inventors of the present invention have realized that an efficient statistical encoding routine can compensate for the poorer predictions of a simple prediction routine, thereby increasing the compression speed without significant reduction in compression rate.

Hence, it is yet another object of the present invention to provide a method and an apparatus applying a simple, fast prediction routine and an improved encoding routine adapted to efficiently encode the larger prediction errors of the simple prediction routine.

In order to fulfill the above objects, the present invention provides, in a first aspect, a method for lossless on-the-fly compression of raw digital image data from an image sensor, the method comprising:

receiving information relating to at least sensor integration time, sensor temperature and analog and digital gain of image data, if applied;

receiving raw digital image data comprising a plurality of pixel values in one or more color planes from the image sensor;

adjusting a pixel value distribution of the received raw image data to precondition the data for compression by applying a gain to the pixel values, the gain being at least partly determined by the received information;

providing two or more prediction routines for predicting pixel values for pixels in clusters of neighboring pixels using other pixel values in the cluster;

selecting, using the received information, a cluster size and an appropriate prediction routine for the image data or for each cluster;

generating pixel prediction errors by, for each cluster and each color plane,
  predicting pixel values using the selected prediction routine, the pixel prediction error being derived from the difference between the predicted pixel value and the preconditioned pixel value,
  evaluating an entropy figure for the each cluster;

providing two or more statistical encoding schemes, each determining codes and corresponding code lengths for pixel prediction errors of a cluster;

encoding the pixel prediction errors of each cluster by, for each color plane,
  using the entropy figure and the received information to determine and select an appropriate statistical encoding scheme for the color plane of the cluster, and
  encoding the pixel prediction errors and the entropy of the cluster according to the selected statistical encoding scheme; and evaluating a length of the bit-stream corresponding to each line of the image, and appending the length to the bit-stream corresponding to the line and/or storing the length in an index table.

Preferably, the method further comprises processing the image data to compensate for inherent noise and errors of the image sensor prior to generating pixel prediction errors.

Preferably, the entropy figure of a cluster is evaluated to reflect the difference between maximum and minimum pixel values in the cluster and a variation of pixel values in the cluster. To make the prediction simpler and faster, the clusters used in predicting pixel values are preferably fixed-size, one-dimensional cluster, such as having a fixed size of 8×1 pixels.

In a second aspect, the invention provide a method for near-lossless on-the-fly compression of raw digital image data from an image sensor, the method comprising:

receiving information relating to at least sensor integration time, sensor temperature and analog gain of image data, if applied, from the image sensor;

receiving raw digital image data comprising a plurality of pixel values in one or more color planes from the image sensor;

adjusting a pixel value distribution of the received raw image data to precondition the data for compression by applying a gain to the pixel values, the gain being at least partly determined by the received information;

gamma correcting the pixel values of the image data;

reducing one or more of the least significant bits of the gamma corrected pixel values;

generating pixel prediction errors by, for each color plane, predicting pixel values for pixels in clusters of neighboring pixels using other pixel values in the cluster, the pixel prediction error being derived from the difference between the predicted pixel value and the preconditioned pixel value, encoding the pixel prediction errors of each cluster evaluating a length of the bit-stream corresponding to each line of the image, and appending the length with the bit-stream corresponding to the line and storing the length in an index table.

The unique feature of gamma correcting the image data prior to bit-reduction and compression naturally requires that a reverse gamma correction be carried out before presenting the data with normal techniques, as that typically also involves a gamma correction. Hence, according to a third aspect, the invention provides a method for decompressing image data, the method comprising:

decoding encoded pixel prediction errors using one or more statistical encoding schemes applied at compression;

calculating pixel values using the decoded pixel prediction errors and a prediction routine applied at compression; and performing a reverse gamma correction of the calculated pixel values.

High quality image files are typically extremely large, typically several hundred megabytes. With the presently available computing power, processing of the entire image may therefore be a heavy and time-consuming burden. Therefore, the present invention provides the possibility to retrieve only specific parts of a compressed image for post-processing, thereby significantly reducing the file-size and the processing burden. Hence, the method for decompressing preferably comprises, prior to the decoding:

provided indexed compressed image data where the indexed parts are suitable for subsampling, zooming, panning, and cropping; and using an embedded line index table or a separate line index table to identify indexed parts selected for decompression.

The methods according to the first and second aspects may be implemented in either software or hardware. According to a fourth and fifth aspect, the methods are implemented in software, and the invention provides electronic storage media storing software for use by a digital image processor in compressing digital image data from an image sensor, the software being executed by the digital image processor in performing the method steps of the first or the second aspect.

According to a third aspect, the methods are implemented in hardware, and the invention provides an image compression section for compressing digital image data, the section being connected to a digital imaging apparatus to receive information relating to at least a sensor integration time, a sensor temperature and analog gain of image data, if applied, and raw digital image data comprising a plurality of pixel values in one or more color planes, the compression section holding gamma correction data, at least two prediction routines for predicting pixel values for pixels in clusters of neighboring pixels using other pixel values in the cluster, and at least two statistical encoding schemes each determining codes and corresponding code lengths for pixel prediction errors of a cluster, the compression section comprising:

a preconditioning block connected to receive the raw digital image data and to adjust a pixel value distribution of the received data to precondition the data for compression by applying a gain to the pixel values, the gain being at least partly determined by the received information;

a bit-reduction block to perform a gamma correction of the pixel values according to the gamma correction data and reducing the number of bits for each gamma corrected pixel value;

a prediction block connected to receive the preconditioned data to generate pixel prediction errors using a selected prediction routine, the prediction block comprising processing means for, for each cluster and each color plane, predicting pixel values using the selected prediction routine, the pixel prediction error being derived from the difference between the predicted pixel value and the preconditioned pixel value, evaluating an entropy figure for each cluster;

an encoding block to encode the pixel prediction errors of each cluster, the encoding block comprising processing means for, for each cluster and each color plane, encoding the pixel prediction errors and the entropy of the cluster using a selected statistical encoding scheme; and an indexing block to evaluate a length of the bit-stream corresponding to each line of the image, and appending the length with the bit-stream corresponding to the line and storing the length in an index table in a memory.

The method may be carried out by an algorithm implemented in software and/or hardware. Implementing the algorithm in hardware only requires a very limited amount of silicon and yields very high performance in terms of processing speed—particular when seen in relation to the very low power consumption.

The compression algorithm contains a line indexing format which enables very fast subsampling of an already compressed image. Line indexing is used to enable rapid subsampling of compressed image. It also improves error correction since an error in the compressed stream of data will only affect one line. The line indexing can be embedded in the compressed stream as well as in a separate file. Placing the indexing file in a separate file improves performance if the compressed file must be subsampled or zoomed into straight from a slow media like a HDD, flash based media or the like. If the indexing file is only embedded within the compressed stream it is necessary to read the entire compressed file into memory in order to extract the indexing information. As the indexing file is very small compared to a the size of a compressed high resolution image, it is a small penalty to pay in terms of extra required storage space, compared to the performance benefits gained when working with the compressed files. The line-indexing format makes it possible to only decompress the parts of an image which of interest. This improves performance and reduces the need for temporary RAM storage greatly when zooming and doing other kinds of postprocessing with compressed image data.

Raw image data means data containing only pixel values that have been read out from the image sensor. The data may be amplified and converted, but no new pixel values have been added to the data e.g. by color interpolation. The data may contain several values for each pixel if more than one value can be read out from pixels of the sensor. One type of image sensors (e.g. Foveon X3) may read out three values from each pixel corresponding to different wavelength intervals of the incident light. Since it is an object to get the data transmitted and stored as fast as possible there is no need for generating more data, and the present invention preferably operates with raw data. The compression algorithm may however be applied to interpolated data as well.

As described previously, the invention preferably applies a fast and simplified prediction scenario. According to a preferred embodiment, one feature of the routine is that small, fixed-size, one-dimensional clusters are used in the prediction scenarios, e.g. a 1×8 cluster. This increases speed but may give rise to more and larger prediction errors, which is compensated for by an efficient adaptive statistical encoding.

The compression algorithm is adaptive as it uses information about image sensor integration time, temperature, and gain to adjust the statistical encoder to optimum performance as well as adjusting the preprocessing gamma curve.

In relation to the disadvantages of U.S. Pat. No. 6,614,483, the present invention provides the following advantages:

A novel solution involving an adjustable loss-introducing stage for avoiding visual degradation of image data which have been compressed and decompressed.

A compression algorithm without need for specific color extraction and interpolation prior to compression since the prediction is line based and utilizes the fact that every second pixel in a line will have the same color filter. The predictor or any other stage does not need to keep track of the position of the specific color filters—this results in a more efficient algorithm which yields higher performance when implemented in software and a smaller silicon footprint as well as higher performance when implemented in an ASIC/FPGA (Application Specific Integrated Circuit/Field Programmable Gate Array).

The lossless and near-lossless nature of the present invention allows for high-quality image processing at a later stage.

A line based compression scenario which reduces the need for external or internal buffer for temporary storage and thereby reduce cost and increase performance.

The algorithm can easily be implemented in a way that makes it very suitable for image sensors with multiple outputs—the small silicon footprint enables easy use of parallel image compression. Multiple image outputs may also be supported by customizing the algorithm for a certain amount of input-channels.

The lossless compression ratios which can be achieved with the present algorithm are almost as good as the ones which can be achieved with state-of-the-art arithmetic compression techniques—but at a fraction of the complexity compared to state-of-the-art arithmetic compression.

BRIEF DESCRIPTION OF THE DRAWINGS

The present invention will now be described with reference to the accompanying figures, where.

DETAILED DESCRIPTION OF THE INVENTION

Figure 1:
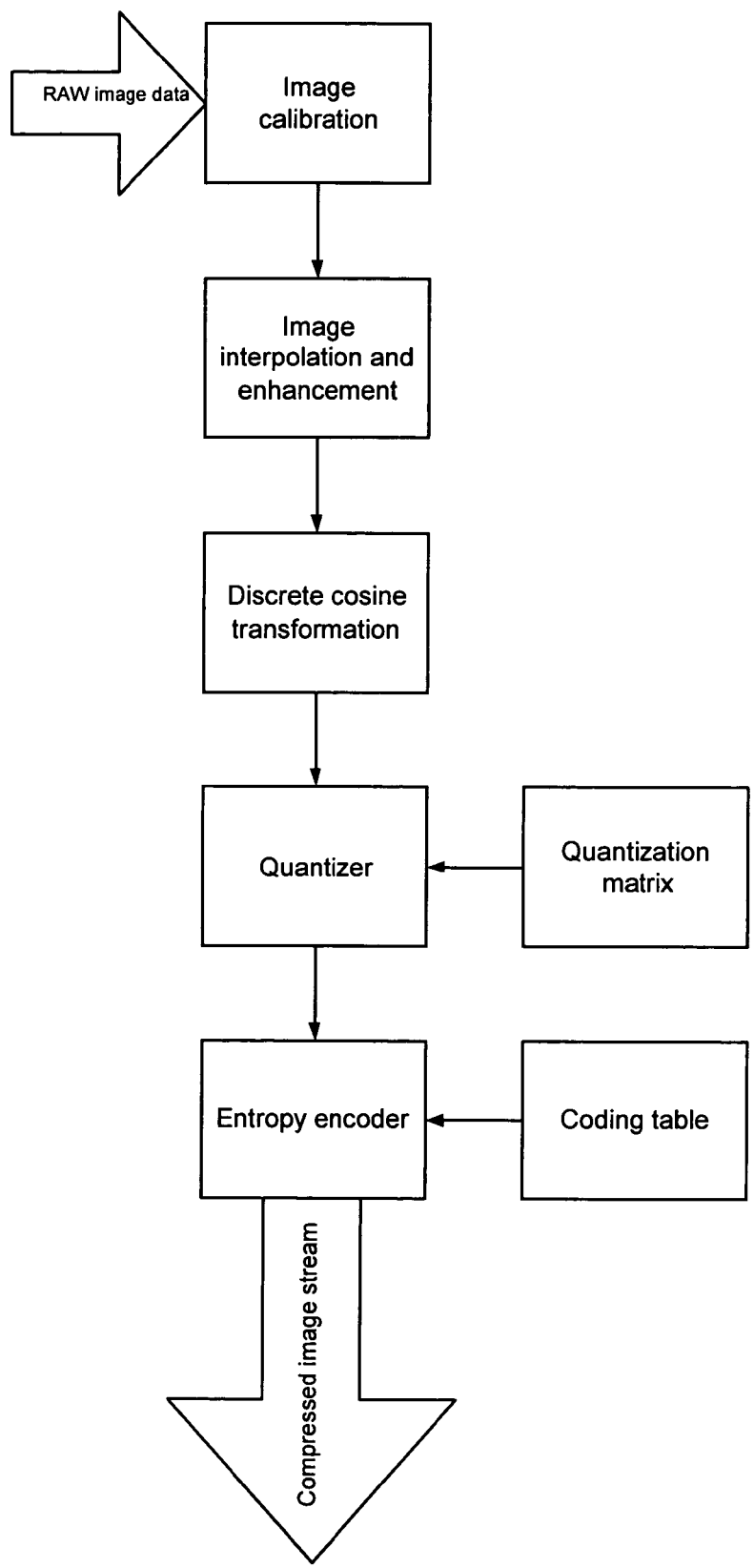
FIG. 1 shows the prior art.
Figure 2A:
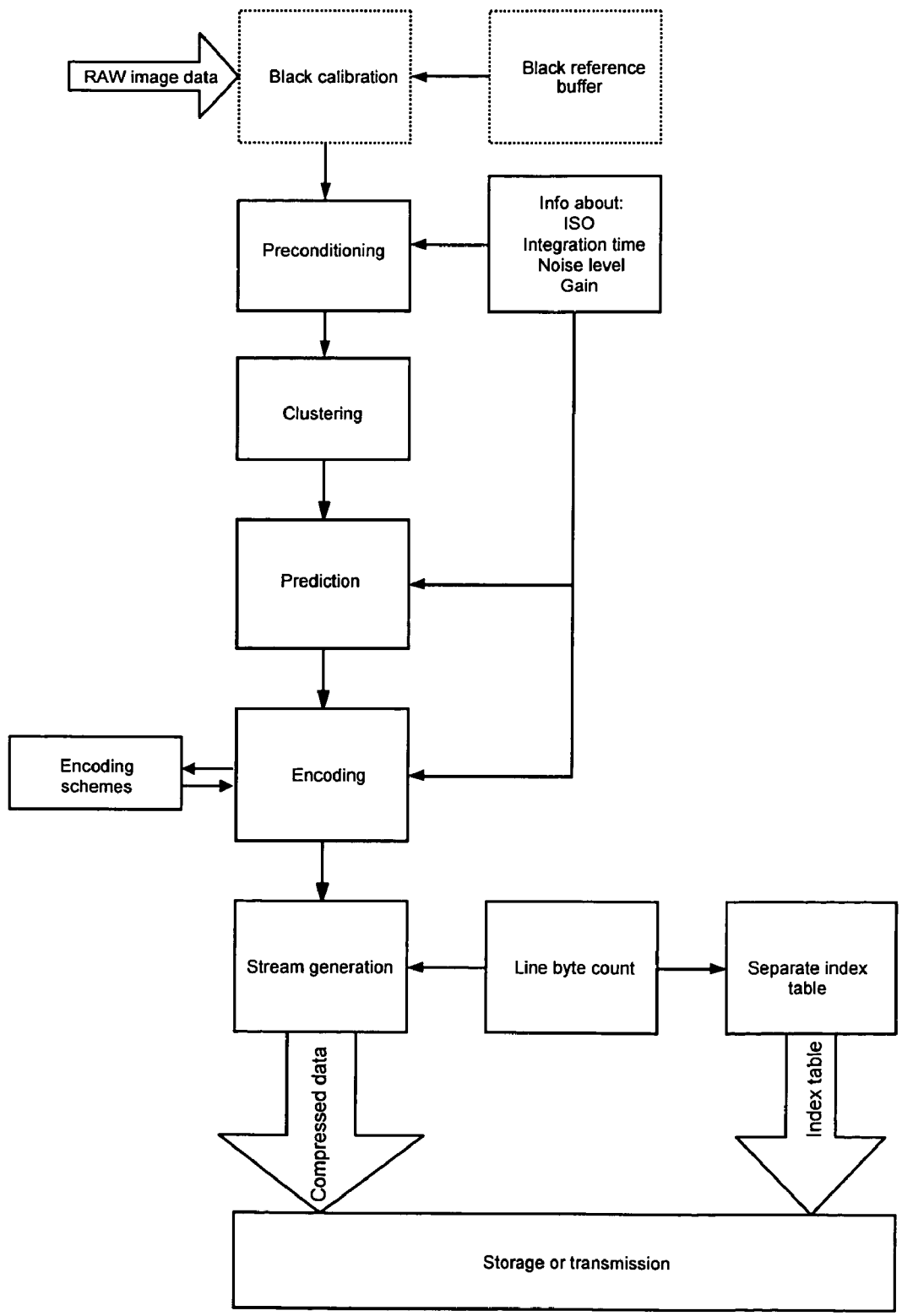
FIGS. 2A and B show block diagrams of two modes of the compression algorithm according to the invention.
Figure 2B:
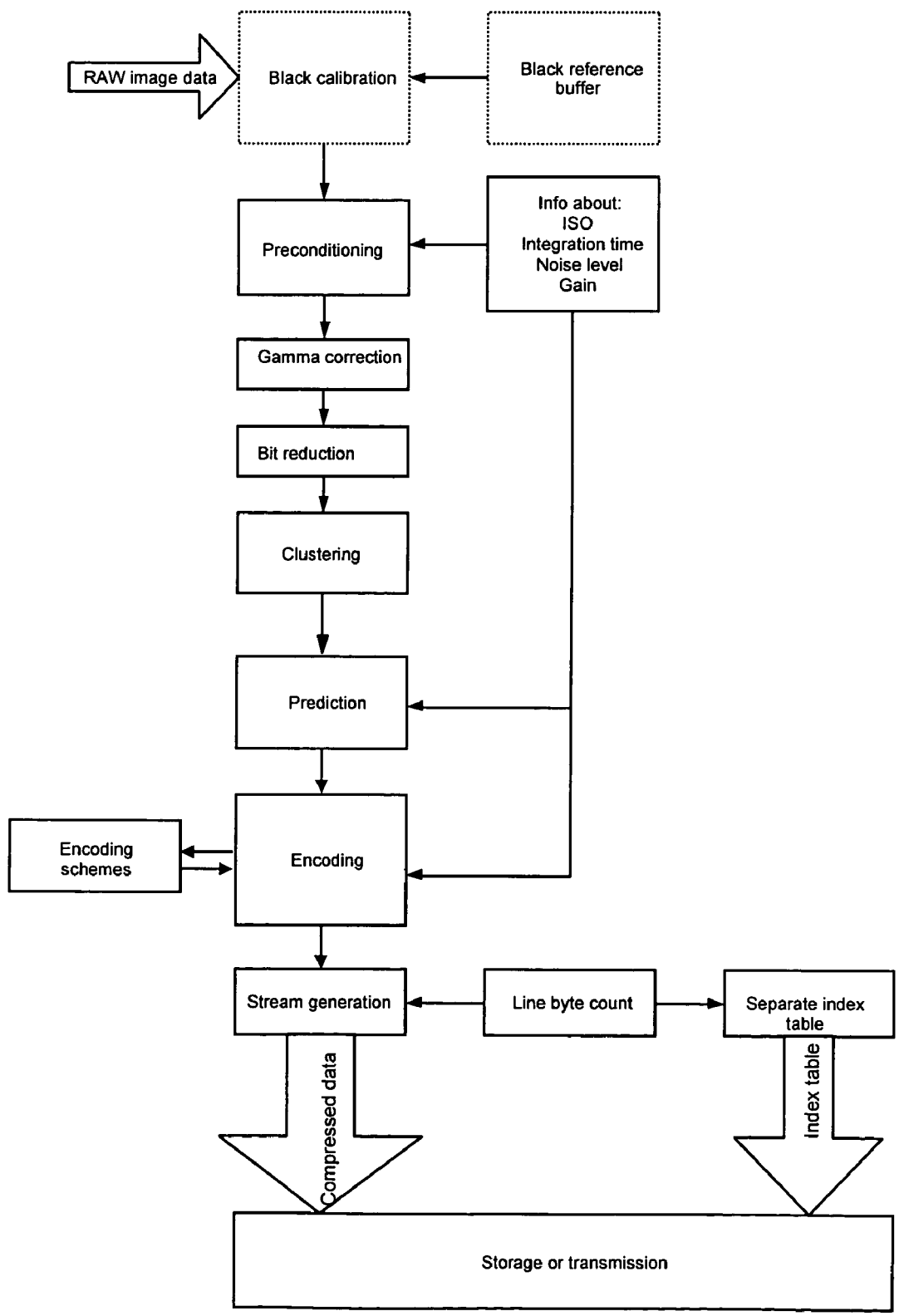

The invention provides a digital imaging system having a compression section implementing an algorithm for lossless or near-lossless compressing high-quality image data. Corresponding block diagrams of the algorithm are shown in FIGS. 2A and B. The algorithm contains a novel structure which enables very fast on-the-fly compression of image data. The digital imaging system can be a digital camera back for a portable digital camera controlled by a camera operation system.

In the following, an embodiment of the part of the image system related to the compression of images is described in relation to FIG. 3. The compression section 10 is positioned close to an image sensor 12, receiving data directly from the sensor 12 through analog amplifier 13 and analog-to-digital converter (ADC) 14. The compression section comprises a number of blocks and processors for performing various operations in relation to the compression, and is connected to a memory 11 holding routines, tables etc. to be used by the various blocks. The memory 11 may also be embodied by smaller memories in connection to each block. The compression section directs the compressed image data file to a unit 15 for storing or transmitting the file. The compression algorithm implemented by the compression section 10 performs the compression according to a number of settings and parameters of the image sensor which affect the noise and statistics of the image data. This can be the integration time (or exposure/shutter time), sensor temperature, ISO setting and an applied analog gain of image data. Therefore, embodiment shown in FIG. 3 include a unit 16 which keeps track of the settings of the image sensor as defined by the user and/or the camera operation system. Typically, the unit 16 forms part of the operation processor of the camera. The system also has a temperature sensor 17, this can also be controlled by the camera operation system. This information related to the image sensor is fed to the compression section and is used to predict the general noise level and statistics of the image data.

The compression section 10 comprises a number of blocks corresponding to different stages of the algorithm. The compression section and the block can be implemented by hardware or software. The highest performance can be achieved by implementing the algorithm hardware (e.g. ASIC, FPGA) or software (using a processor such as DSP Digital Signal Processor)) which does not require external RAM capacity to be used. The algorithm is made to easily fit into a parallel processing architecture, as this will yield the highest performance. Alternatively, the algorithm can be implemented in software stored on an electronic storage medium included in compression section 10 for use by a digital image processor included in compression section 10. The software can be executed by the digital image processor to perform the algorithm.

Figure 3:
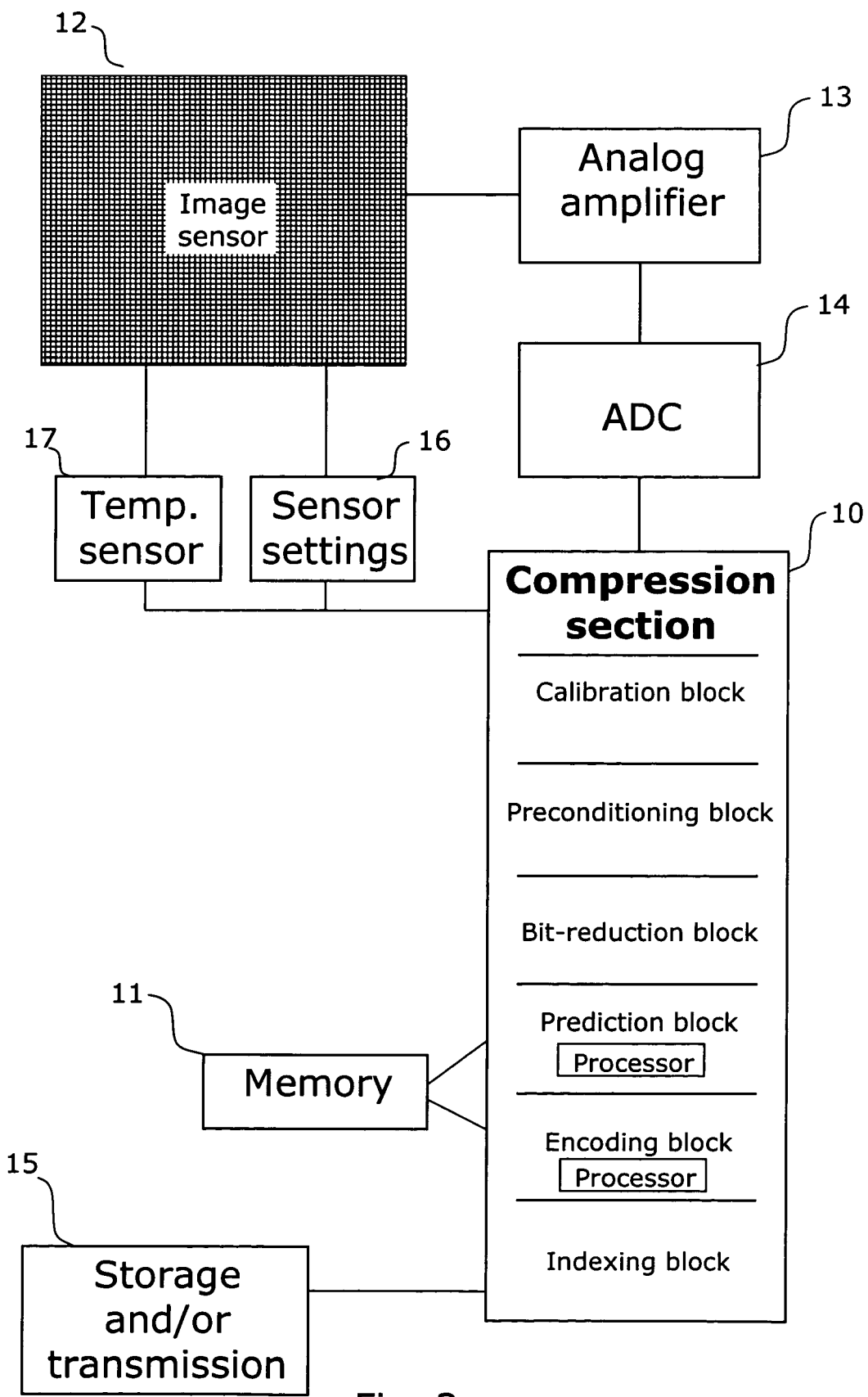
FIG. 3 shows an embodiment of a digital imaging system used to implement the method and algorithm according to the invention.

As shown in FIG. 3, the compression section 10 is optimized to handle raw image data coming straight from the analog-digital converter 14 in a digital imaging front-end. Image sensor 14 can have any configuration of color filter pattern, e.g. a Bayer pattern. Some image sensors generate red, green, and blue color components straight in the image sensor array without the need for interpolation. These sensors are also fully supported along with monochrome types of sensors. The compression section 10 can also work with data which have been preprocessed and interpolated to reveal three color parameters for each pixel. In a preferred embodiment, such processing is postponed in order to save silicon, increase compression speed and minimize the size of the compressed image data.

The compression algorithm according to the invention has both a lossless compression mode and a near-lossless compression mode, as outlined in the block diagrams of FIGS. 2A and B. The mode can be selected by the user in the camera operation system.

A brief overview of the involved stages of the algorithm is presented in the following, hereafter a detailed description of each stage is given.

Black Calibration (Optional). Serves to remove inherent noise of the camera.

Preconditioning. Prepares the image data for compression by harmonizing the data to the performance of the compression stages.

Gamma Correction and Bit Reduction (Only Near Lossless). Performs a gamma correction similar to what is done at image presentation (printers, monitors). Bit reduction is carried out on the corrected data so that the reduced bit are bits which are not significant in the presented image. A reverse gamma correction is to be applied at decompression.

Clustering. Groups pixels in clusters of well-defined size.

Prediction. Use noise information to choose a prediction strategy for predicting values for each pixel in a cluster using values of other pixels in the cluster, and only the error of the predicted value is used together with an entropy figure for the cluster.

Encoding. Uses the entropy figures to choose the optimum encoding values for the pixel prediction errors, and encodes the entropy figures followed by the pixel prediction errors.

Stream Generation. Generates a final compressed stream of encoded pixel values for each line with additional information about the entropy level for each cluster.

Index Generation. The size of each encoded line is stored to enable fast access for postprocessing functions (e.g. zoom).

Decoding the compressed image data consists of doing all the above in reverse.

Black Calibration

In the embodiments outlined by the block diagrams of FIGS. 2A and B, raw image data can be black calibrated to remove the fixed pattern noise which is generated as a function of temperature as well as integration time in the image sensor array. This process is called black calibration as the fixed pattern which is subtracted is obtained while the image sensor is not illuminated. This stage is not a necessity prior to compressing image data (and is therefore shown with punctured lines) but to achieve high image quality which is particular important in digital still imaging, some sort of black calibration should be carried out prior to having a final processed image. The advantage of removing the fixed pattern noise as early as possible is that it removes the need to store any kind of black calibration file along with the image data in order to use this at a later stage. Some image sensors have a fixed pattern noise which is easy to characterize and thereby also easy to remove—sometimes without the need to subtract a black calibration file as the fixed pattern noise can either be predicted and/or adaptively removed. If this is the case, the black reference buffer as shown in FIGS. 2A and B is no longer needed, and the imaging system can be further reduced.

Apart from removing fixed pattern noise by subtracting a black reference image, other blemishes like dead columns, cluster defects, etc. can be corrected. The black calibrated and possibly blemish corrected data is fed to the preconditioning stage.

Preconditioning

The preconditioning stage can either accept data straight from the image sensor or from a previous black calibration stage. The preconditioning stage conditions the incoming image data in a way to allow the following stages to perform at their best, thereby creating optimum compression ratio and image quality. This can be done by ensuring that the incoming data has image values that have a statistical distribution that does not differ too much between captures.

Figure 4:
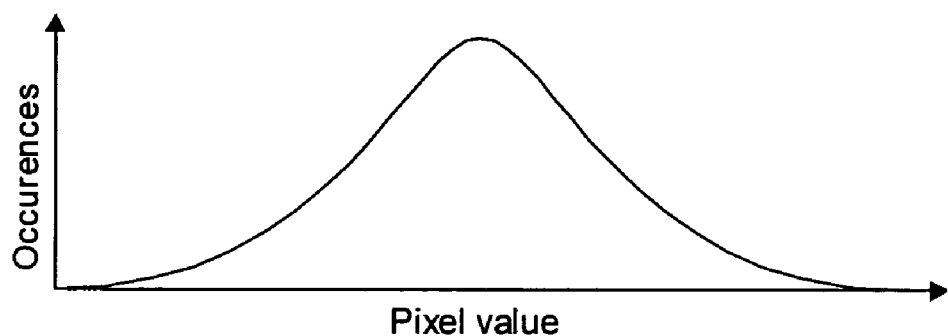
FIG. 4 shows a histogram for ISO100 raw image data.
Figure 5:
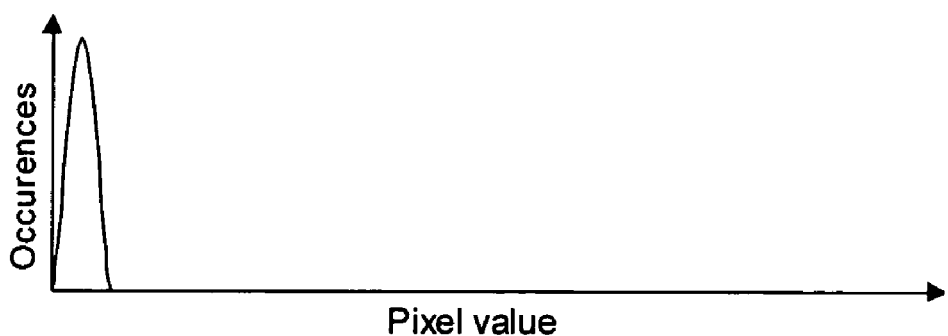
FIG. 5 shows a histogram for ISO1600 raw image data.

To understand the need for this preconditioning, one needs more information about the nature of image data under different image capture settings. An image that has been captured at a high ISO value (e.g. 1600) usually needs to be gained digitally at some stage to compensate for the smaller signal from the image sensor as the maximum analog signal from the sensor is typically limited to a lower ISO output (e.g. 100). FIG. 4 shows an ISO100 histogram example. Boosting the ISO from 100 to 1600 requires a gain factor of 16 (analog and/or digital gain). An ISO 1600 image which has been correctly exposed will have raw pixel values that are all less than maximum_pixel_value/16. FIG. 5 shows an example of an ISO1600 histogram. As one of the later stages of the compression section contains a statistical encoder, this encoder will not perform at its optimum if the statistics which it is based on is suddenly very far from the actual statistics of the image data which is being compressed.

Figure 6:
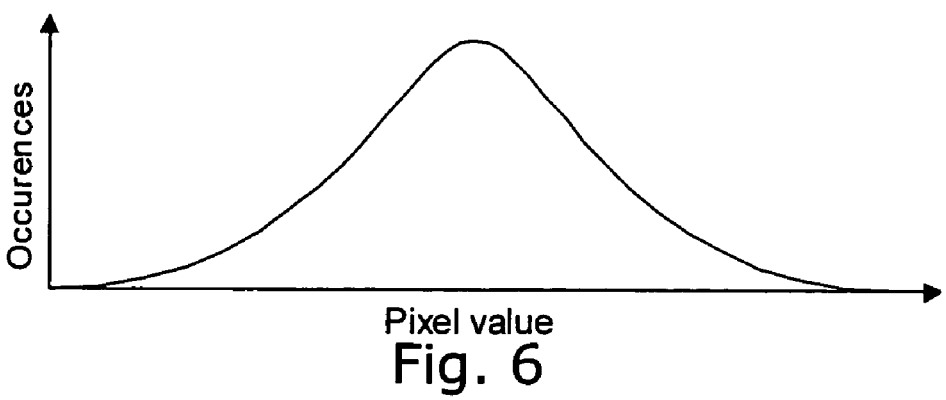
FIG. 6 shows a histogram for gained ISO1600 raw image data.

One way to make the statistics of a low ISO image and a high ISO image more equal is to gain (analog or digital) the raw image data of the high ISO image. FIG. 6 shows how the distribution of pixel values from FIG. 5 moves when gain is applied.

Another solution can be to have a statistical encoder who adapts its statistics based on the image data or by using other inputs which can help to indicate the optimum statistical encoding. Using knowledge about ISO, image sensor integration time, and image sensor temperature is even more beneficial as it provides a very simple way to fine-tune the statistical encoder prior to passing image data to this stage.

Another reason for gaining image data like that of the histogram of FIG. 5 is that it improves image quality in a final high ISO image when lossy image compression is used. If no precompression gain were applied, the errors introduced by the lossy part of the compression would be amplified in the resulting processed image. It is particular important to reduce the errors in high ISO images as they will have to go through severe image enhancement processing prior to having a final image. If a lot of digital gain is applied following the bit reduction stage, the final processed image will contain a lot of quantization errors resulting in an unwanted phenomenon known as image "banding". All in all, applying gain prior to the lossy stage is most often an advantage when considering the final image quality.

Depending on the nature of image data as well as the selection of lossless or lossy compression, the preconditioning stage can either be bypassed or used. Bypassing the preconditioning gain stage is equivalent to setting the gain to 1.

Bit-Reduction

The next stage in the algorithm is an optional lossy bit-reduction stage used to adjust the compression ratio, the stage is bypassed if lossless compression is desired.

In general, there are two basic lossy compression schemes:

Lossy transform schemes. Samples of picture are taken, chopped into small segments, transformed into a new basis space. The resulting values are then bit-reduced and entropy coded.

Lossy predictive schemes. Previous data is used to predict the current image frame. The error between the predicted data and the real data, together with any extra information needed to reproduce the prediction, is then coded.

The lossy stage of the present compression algorithm operates in the predictive scheme and does not apply any transform coding as compression methods operating in the lossy transform schemes (e.g. JPEG).

It is well known that the discrete cosine transform applied in JPEG compression gives rise to "blocky" and "blurry" compression artifacts which can also generate oscillating patterns when compressing high contrast images, typically due to 8×8 pixel squares containing a stripe or "checkerboard" pattern. These compression artifacts are extremely difficult to get rid of in later processing.

The compression artifacts introduced by the present compression algorithm are typically simple quantization errors visible as color "banding", where coarse color transitions result from a too low bit depth. It is a huge advantage of the present invention that such banding compression artifacts can easily be removed.

Figures 7, 8, 9:
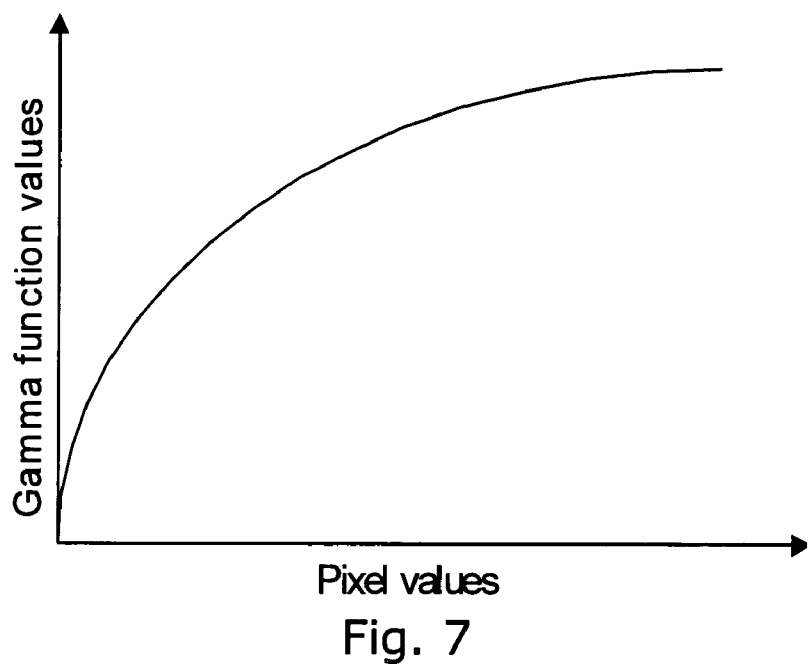
FIG. 7 shows an example of a gamma curve.
FIG. 8 shows an 8×1-pixel cluster.
FIG. 9 shows an 8×8-pixel cluster.

According to the present compression algorithm, a gamma correction is applied prior to reducing the amount of information in the image data pool. The gamma correction can be implemented as a look-up table, a mathematical function, or a piecewise linear approximation to a true gamma curve. FIG. 7 shows an example of a gamma curve.

After the gamma-function has been applied it is possible to reduce the amount of bits per pixel from a high number (e.g. 16 bits) to a figure that suits the bit-depth per color of the final processed image, such as 8 bits per pixel. If the gamma correction is implemented as a look-up table it is an advantage to embed the bit-reduction part within the table, as this reduces the size of the table thereby reducing implementation cost in hardware and basic system strains. The use of a gamma-function to implement a near-lossless data reduction yields a very high quality image after it has been compressed, decompressed, and subjected to the final image enhancement stage. This is due to fact that a gamma curve is applied in the final image enhancement process hereby creating the same commanding function as the gamma curve applied prior to the prediction stage. A straight linear division of all pixel values would create a visible loss of data in the darker areas of the final image, hereby yielding a lower quality image with a noisy appearance. The compression ratio can easily be changed by reducing the bit-depth of each pixel. The higher bit-reduction, the higher compression ratio can be achieved.

An example of a gamma table with built-in bit-reduction functionality is shown in Table 1 below

TABLE 1

| Input data (16 bit binary) | Output data (12 bit binary) |
| --- | --- |
| 0000000000000001 | 000000000111 |
| 0000000000000010 | 000000001011 |
| 0000000000000011 | 000000001101 |
| 0000000000000100 | 000000001111 |
| 0000000000000101 | 000000010000 |
| 0000000000000110 | 000000010010 |
| 0000000000000111 | 000000010100 |
| 0000000000001000 | 000000010110 |
| . | . |
| . | . |
| . | . |
| 1111111111111000 | 111111111111 |
| 1111111111111001 | 111111111111 |
| 1111111111111010 | 111111111111 |
| 1111111111111011 | 111111111111 |
| 1111111111111100 | 111111111111 |
| 1111111111111101 | 111111111111 |
| 1111111111111110 | 111111111111 |
| 1111111111111111 | 111111111111 |

Other implementations of a lossy stage are possible but the distinct advantage of the lossy part of the present invention is that it is very simple while still giving impressive results in the present images. Also, it can be can be added as a separate stage without affecting the implementation of the following compression stage which is by nature lossless.

A slightly more advanced implementation of a lossy stage may further include an averaging function (prior to removing bits) of the lower bits of neighboring pixels of the same color which would yield even better results as the least significant bits are not just removed but also affect the value of the resulting least significant bit following the bit reduction stage. Using the possibility to average the least significant pixels prior to the prediction stage, less of the least significant bits may be discarded. This is because the averaging function improves the signal-to-noise ratio and thereby the performance of the prediction stage if the image data contains a large quantity of noise, making it difficult to predict the correct values.

Using information about the general level of noise in the image data, it is possible to fine-tune the lossy stage to apply just the right amount of noise suppression and then remove the amount of data which would anyway later be removed by the final image enhancement processing. Applying careful noise suppression followed by a data reduction at an early stage improves image compression ratios without sacrificing image quality.

Clustering

Following the lossy stage, data enters the clustering stage. In this stage data is being grouped in clusters of a well-defined size. The optimum cluster size for high throughput performance, low cost, and good compression ratio for image data from a Bayer filter pattern sensor is an 8×1 cluster consisting of 8 pixels horizontally in a line as shown in FIG. 8. Slightly higher compression ratios can be achieved by using cluster sizes of 8×2, 6×2, 8×4, 6×4, 4×4, 6×6, 8×8 and the like, FIG. 9 shows an 8×8 cluster.

Figure 10:
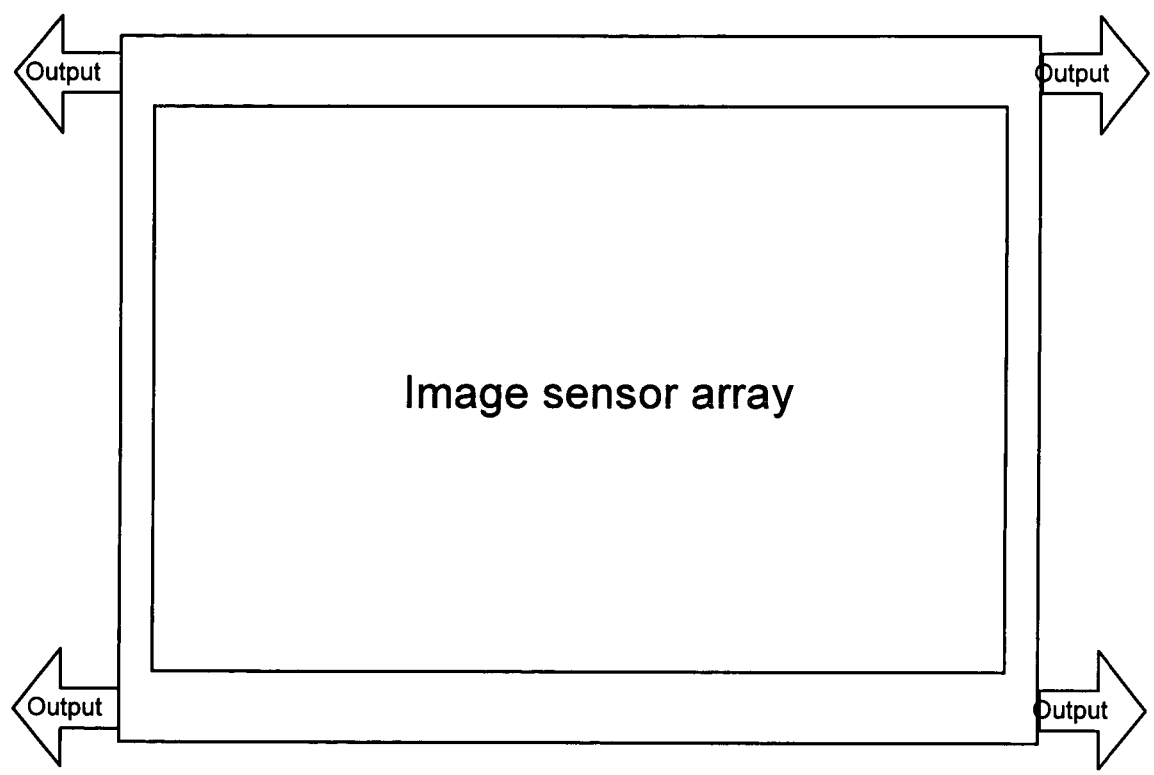
FIG. 10 shows an example of a multiple output image sensor.

Using cluster sizes which require data from more than one line of image data, forces the image compression implementation to buffer (store) at least one extra line in memory to be able to compress the following line. For high performance this data must be available on the same silicon as the compression engine to avoid slower access times and more power consuming accesses to external memory. Accessing external memory either increases system cost or decreases performance—often making it impossible to compress data on-the-fly thereby losing the great benefit of reducing data straight as it is read out from the image sensor. The problem with buffering more lines in fast memory becomes very obvious when high performance image sensors with several outputs are being used. These sensors with lines that can be thousands of pixels long (>4000 pixels in a line is common these days) may supply data from distant parts of the same image at the same time, thereby at least doubling the buffering demands and increasing the demands to the complexity and performance of the compression engine implementation. Using an image sensor with 4 outputs, lines with 5000 pixels, and choosing a cluster size of 8×8, the buffering capacity demand will at least be 175 kB with 16 bits per pixel. This is quite expensive if it is implemented as fast on-chip SRAM (i.e. cache), and it is not available in low power, high performance DSP or other commercially available processors of today. FIG. 10 shows an example of an image sensor with multiple outputs. For that reason the solution with an 8×8 cluster would most often require use of external memory with lower bandwidth (compared with on-chip solutions) and typically higher power consumption, but which is relatively cheap. With the technology of today, the resulting implementation based on an 8×8 cluster will take up more boards space, consume more power, have lower performance, and will most likely not be able to compress image data on-the-fly from high-end imaging sensors.

An 8×1 cluster solves all of the above at a low cost with the only penalty being a slightly lower compression ratio. Another advantage of the 8×1 cluster is that it fits very well with the cache line size of many standard processors as well as the burst capability of standard memory interfaces.

Prediction

With the small cluster size and simple prediction routine, the present compression algorithm uses an adaptive one-pass prediction and encoding stage to achieve higher throughput rates without compromising compression ratio significantly. This approach is significantly different from typical solutions based on adaptive two-pass encoding strategies, where all image data is first analyzed to determine the optimum encoding prior to doing a second pass of all image data to do the actual encoding. The one-pass method is faster and requires less memory than the two-pass encoding strategy.

The one-pass method is made possible because general trends of the noise level and statistics of the image data can be deducted from the information related to the settings of the image sensors. This information allows the algorithm to choose an appropriate prediction routine and thereby eliminates the need for analyzing the entire data pool prior to selecting a prediction strategy. As an example, it is attractive to select a very simple prediction strategy if the general noise level of the data is very high, since even advanced prediction strategies cannot predict random noise. Instead, by selecting a fast and simple one-pass prediction routine and instead providing encoding routines adapted on cluster level, and much faster, a very efficient compression is provided.

Within each cluster, image data entropy is being determined and later used to choose the optimum encoding for each cluster. The entropy figure of a cluster is evaluated to reflect the difference between maximum and minimum pixel values in the cluster and a variation of pixel values in the cluster.

The clustered image data enters the prediction sector in which each pixel value in the cluster is predicted using information from the previous pixels. A pixel can either be solely predicted from previous pixel values of the same color or from previous pixel values of different colors. The very simplest prediction for Bayer image data is that a pixel is predicted to have the same value as the previous pixel of the same color. A slightly more sophisticated prediction may use more than one previous pixel to predict the next pixel. Use of more pixels where they are weighted with the most weight placed on the pixels closest to the pixel to be predicted yields slightly better results. When using cluster sizes with more than one line, pixels of the same color within short distance from the predicted pixel in both the horizontal and the vertical direction can be used to predict the pixel value.

As contrast information is not entirely confined to the green pixels, it is also beneficial to use pixels of other colors to help predict a pixel. How advanced the prediction stage should be depends greatly on the typical amount of noise in the compressed images. With a lot of noise in the image, a very advanced prediction algorithm does not improve compression ratio significantly simply because it is impossible to predict random noise. With less noise in the image or with the addition of a lossy stage with noise suppression, the advantage of more sophisticated prediction increases.

A lossy stage can be included within the prediction stage by for instance accepting prediction errors which differ (smaller than) from the actual figure which is calculated as the difference between the predicted value and the correct value.

When the pixel value has been predicted, the difference (error) from the actual value is temporarily stored as the value to be encoded for that pixel. When the prediction errors for all the pixels in a cluster has been determined, a figure for the amount of entropy within that block is obtained as the maximum prediction error for each color within the cluster. The entropy figures as well as the pixel prediction errors are passed on to the encoding stage.

Encoding

The encoding stage uses the entropy figures to choose the optimum encoding values for the pixel prediction errors for each color plane within the cluster, hereby adaptively adjusting the encoding to yield the shortest possible codes for the image data within each cluster. Within each cluster, the entropy figures are encoded themselves, followed by the encoded pixel prediction errors. If an entropy figure has not changed since the previous cluster, the entropy code is encoded with a very short code to indicate that the previous value is still valid.

The encoding stage of the present invention makes use of different statistical encoding schemes to choose from when encoding a cluster, the choice depending on the entropy figure for the cluster and on the general noise and statistics information from the image sensor. In a preferred embodiment, the statistical encoding schemes are small tables with different statistical encoding values for the prediction errors of a cluster. The tables can be combined with encoding strategies based on mathematical formulas providing acceptable short codes for input data of variable size. For e.g. a cluster with a small entropy figure and where the general noise level of the image data is low, small pixel prediction errors are mapped to their corresponding statistical optimal encoding values whereas larger pixel prediction values are encoded straight. For another combination of entropy figure and general noise level of the image data, the encoding scheme may favor the mid-range or large prediction errors. The encoding schemes could also be represented by a curve or a mathematical formula.

Table 2 below shows an example of an encoding table based on statistical input where a high value is more likely to occur than a low one:

TABLE 2

| Input value (binary) | Output value (binary) |
|---|---|
| 0 | 111 |
| 1 | 110 |
| 10 | 101 |
| 11 | 100 |
| 100 | 11 |
| 101 | 10 |
| 110 | 1 |
| 111 | 0 |

The use of a number of small tables avoids the use of for instance a large Huffman encoding table which for 16 bits pixel data would take up 1 Mbit of fast accessible storage compared to only 220 bits for the simplest version of the present invention.

To achieve higher compression ratios, run-length encoding can also be used as a supplement to the previously described encoding, but at the cost of a higher complexity and possibly a lower throughput performance. The advantage is an increased compression ratio for images with regions of very low entropy. In reality run-length encoding is only useful in combination with lossy compression or image data with extremely low noise level.

Stream and Index Generation

The encoded data is passed on to the stream generating stage where the final compressed stream of image data is generated. Each line of pixels is converted into a stream of encoded pixel values with additional information about the entropy level for each cluster. At the end of each line, the size of the encoded line is appended to the encoded stream of pixel values. The size of the line is also stored in a separate index table to enable fast access for postprocessing functions (e.g. zoom) when the compressed image is stored on a slow media.

The final compressed image can either be stored temporarily (e.g. in RAM) and/or on a permanent storage media (e.g. on a HDD). The index file can be stored alongside the image file or extracted from the compressed image stream at a later stage. Transmitting the compressed file over a media (wire, wireless, optical, or any other) will also yield improved performance due to the limited bandwidth requirements caused by the compressed image data.

Postprocessing

The image calibration is mainly postponed until the final image enhancement stage as this enables the use of very sophisticated image sensor calibration techniques, which improves the final image quality. There is a great advantage in postponing the image enhancement to a later stage where more processor resources may be available and processing time and power consumption is less critical. The final image calibration and image enhancement may be carried out by the same physical unit which incorporates the compression block. Image calibration and image enhancement may also be handled by another physical unit with processor resources such as a computer. Decompression can be carried out at very high speeds using a standard software implementation of the algorithm running in a standard computer.

The present invention yields very stable compression ratios which in connection with system design is more useful than an algorithm that sometimes generates very high compression ratios and at other times hardly compresses data at all. The deterministic compression performance enables design of a surrounding digital imaging system which does not need a lot of overhead, but can instead use the reduced amount of data to achieve higher performance and/or lower system cost. Using the near-lossless compression setting, a typical high-quality image will be compressed to $1/8^{th}$, compared to the size it has when it is fully processed. The image quality achieved is superior to what can be achieved with a standard baseline JPEG set to $1/8^{th}$ compression, as visual image artifacts are totally absent no matter which image is being compressed.

Being able to compress high-quality image data for later high-speed selective decompression makes the present invention very useful in image bank systems where high-quality image data must be stored, retrieved rapidly, and postprocessed—possibly making use of the selective decompression ability to speed data retrieval and modification even further. With a common standard it will be possible to create a new high-quality image data format which contains compressed RAW data with postprocessing directives appended to the RAW image data.

The invention claimed is:

1. A method for lossless on-the-fly compression of raw digital image data from an image sensor, the method comprising:
   receiving information relating to a noise level and a gain of image data from the image sensor;
   receiving raw digital image data comprising a plurality of pixel values in one or more color planes from the image sensor;
   adjusting a pixel value distribution of the received raw digital image data to precondition the data for compression by applying a gain to the pixel values, the gain being at least partly determined by the received information;
   providing two or more prediction routines for predicting pixel values for pixels in clusters of neighboring pixels using other pixel values in the cluster;
   selecting, using the received information, a cluster size and an appropriate prediction routine for the image data or for each cluster;
   generating pixel prediction errors by, for each cluster and each color plane,
      predicting pixel values using the selected prediction routine, the pixel prediction error being derived from a difference between the predicted pixel value and the preconditioned pixel value, and
      evaluating an entropy figure for each cluster;
   providing two or more statistical encoding schemes, each determining codes and corresponding code lengths for pixel prediction errors of a cluster;
   encoding the pixel prediction errors of each cluster by, for each color plane,
      using the entropy figure and the received information to determine and select an appropriate statistical encoding scheme for the color plane of the cluster, and
      encoding the pixel prediction errors and the entropy of the cluster according to the selected statistical encoding scheme; and
   evaluating a length of a bit-stream corresponding to each line of the image, and appending the length to the bit-stream corresponding to the line and/or storing the length in an index table.

2. The method for on-the-fly compression according to claim 1, wherein the method further comprises, prior to generating pixel prediction errors, processing the image data to compensate for inherent noise and errors of the image sensor.

3. The method for on-the-fly compression according to claim 1, wherein the entropy figure of a cluster is evaluated to reflect a difference between maximum and minimum pixel values in the cluster and a variation of pixel values in the cluster.

4. The method for on-the-fly compression according to claim 1, wherein the clusters used in predicting pixel values are fixed-size, one-dimensional clusters.

5. The method for on-the-fly compression according to claim 1, wherein the cluster has a fixed size of 8×1.

6. An electronic storage medium storing software for use by a digital image processor in compressing digital image data from the image sensor, the software being executed by the digital image processor in performing the steps of claim 1.

7. A method for near-lossless on-the-fly compression of raw digital image data from an image sensor, the method comprising:
   receiving information relating to a noise level and a gain of image data from the image sensor;
   receiving raw digital image data comprising a plurality of pixel values in one or more color planes from the image sensor;
   adjusting a pixel value distribution of the received raw digital image data to precondition the data for compression by applying a gain to the pixel values, the gain being at least partly determined by the received information;
   gamma correcting the pixel values of the image data;
   reducing one or more of least significant bits of the gamma corrected pixel values;
   generating pixel prediction errors by, for each color plane, predicting pixel values for pixels in clusters of neighboring pixels using other pixel values in the cluster, the pixel prediction error being derived from a difference between the predicted pixel value and the preconditioned pixel value,
   encoding the pixel prediction errors of each cluster; and
   evaluating a length of a bit-stream corresponding to each line of the image, and appending the length to the bit-stream corresponding to the line and storing the length in an index table.

8. An electronic storage medium storing software for use by a digital image processor in compressing digital image data from the image sensor, the software being executed by the digital image processor in performing the steps of claim 7.

9. A method for decompressing near-lossless compressed digital image data for the purpose of post-processing, wherein only specific parts of a compressed image are retrieved without having to decompress the entire image, the method comprising:
   providing indexed compressed image data for subsampling, zooming, panning, or cropping;
   using an embedded line index table or a separate line index table to identify indexed parts selected for decompression;
   decoding encoded pixel prediction errors using one or more statistical encoding schemes applied at compression;

calculating pixel values using the decoded pixel prediction errors and a prediction routine applied at compression; and performing a reverse gamma correction of the calculated pixel values.

10. An image compression section for compressing digital image data, the compression section being connected to a digital imaging apparatus to receive information relating to a noise level and a gain of image data from an image sensor, and raw digital image data comprising a plurality of pixel values in one or more color planes, the compression section holding gamma correction data, at least two prediction routines for predicting pixel values for pixels in clusters of neighboring pixels using other pixel values in the cluster, and at least two statistical encoding schemes each determining codes and corresponding code lengths for pixel prediction errors of a cluster, the compression section comprising:

a preconditioning block connected to receive the raw digital image data and to adjust a pixel value distribution of the received data to precondition the data for compression by applying a gain to the pixel values, the gain being at least partly determined by the received information;

a bit-reduction block to perform a gamma correction of the pixel values according to the gamma correction data and reducing a number of bits for each gamma corrected pixel value;

a prediction block connected to receive the preconditioned data to generate pixel prediction errors using a selected prediction routine, the prediction block comprising processing means for, for each cluster and each color plane, predicting pixel values using the selected prediction routine, the pixel prediction error being derived from a difference between the predicted pixel value and the preconditioned pixel value, and evaluating an entropy figure for each cluster;

an encoding block to encode the pixel prediction errors of each cluster, the encoding block comprising processing means for, for each cluster and each color plane, encoding the pixel prediction errors and the entropy of the cluster using a selected statistical encoding scheme; and an indexing block to evaluate a length of a bit-stream corresponding to each line of the image, and appending the length to the bit-stream corresponding to the line and storing the length in an index table in a memory.

* * * * *